(12) United States Patent
Grethel et al.

(10) Patent No.: US 7,832,708 B2
(45) Date of Patent: Nov. 16, 2010

(54) SOLENOID VALVE DEVICE

(75) Inventors: Marco Grethel, Buehlertal (DE); Reinhard Stehr, Buehl (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 747 days.

(21) Appl. No.: 11/312,861

(22) Filed: Dec. 20, 2005

(65) Prior Publication Data
US 2006/0138373 A1 Jun. 29, 2006

(30) Foreign Application Priority Data
Dec. 23, 2004 (DE) .................. 10 2004 061 955

(51) Int. Cl.
*F16K 31/02* (2006.01)
(52) U.S. Cl. .................. 251/129.15; 251/129.01; 335/258
(58) Field of Classification Search ............ 251/129.01, 251/129.15; 335/255, 258
See application file for complete search history.

(56) References Cited

U.S. PATENT DOCUMENTS

| 4,779,582 | A | * | 10/1988 | Lequesne | ............ | 123/90.11 |
|---|---|---|---|---|---|---|
| 6,065,734 | A | * | 5/2000 | Tackett et al. | .......... | 251/129.02 |
| 6,619,615 | B1 | | 9/2003 | Mayr et al. | ............ | 251/129.08 |
| 6,925,975 | B2 | * | 8/2005 | Ozawa et al. | ............ | 123/90.11 |
| 7,227,439 | B2 | * | 6/2007 | Kelly | .......... | 335/229 |

FOREIGN PATENT DOCUMENTS

| DE | 199 04 901 | 8/2000 |
|---|---|---|
| DE | 100 44 486 | 4/2001 |
| DE | 102 08 899 | 9/2003 |
| WO | WO 02/43083 | 5/2002 |

\* cited by examiner

*Primary Examiner*—John K Fristoe, Jr.
(74) *Attorney, Agent, or Firm*—Davidson, Davidson & Kappel, LLC

(57) ABSTRACT

A solenoid valve device, in particular a hydraulic valve device, has a solenoid element which is movable from a non-energized retracted state into an energized extended state, the working stroke of the solenoid element from its retracted state into its extended state including a constant magnetic force working stroke and an idle stroke in which the magnetic force is not constant, but decreases over the stroke.

6 Claims, 3 Drawing Sheets

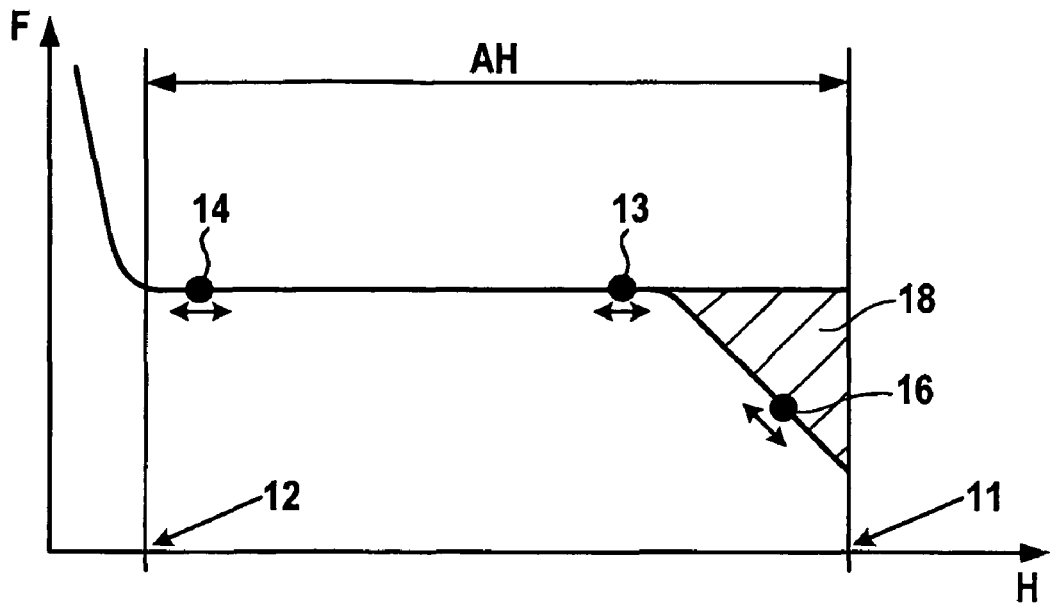
Fig. 2
Fig. 3
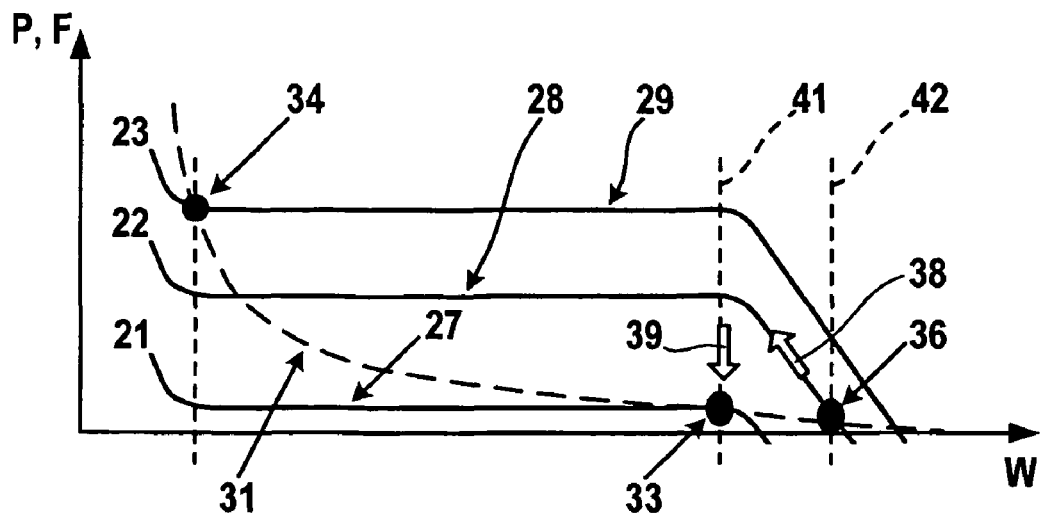

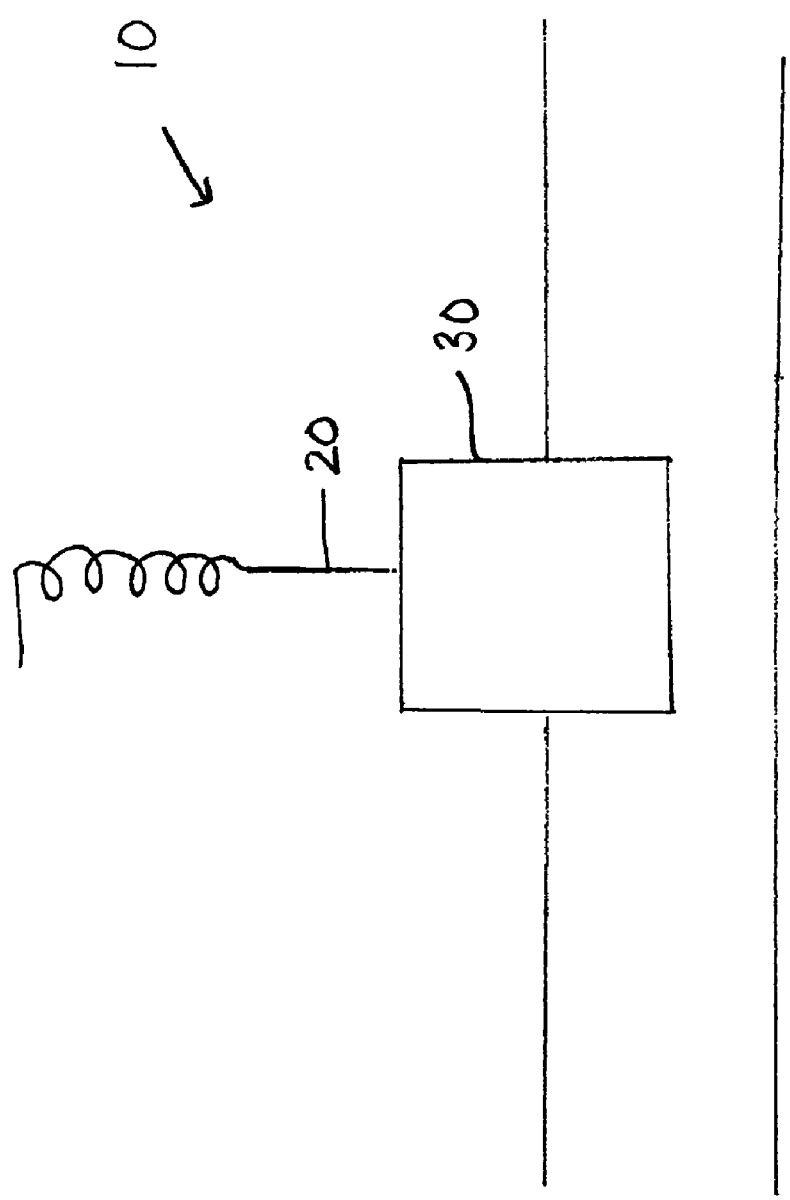

SOLENOID VALVE DEVICE

This claims the benefit of German Application No. 10 2004 061 955.7, filed Dec. 23, 2004 and hereby incorporated by reference herein.

BACKGROUND

The present invention relates to a solenoid valve device, in particular a hydraulic valve device, having a solenoid element which is movable from a non-energized retracted state to an energized extended state, the stroke of the solenoid element from its retracted state to its extended state in the range at an essentially constant magnetic force being referred to as a constant force working stroke and in the related art being normally reduced, via stroke limitation, by an idle stroke in which the magnetic force is not constant, but decreases over the stroke.

In known electrohydraulic proportional pressure valves, the working stroke of the solenoid element is limited to the range having a constant force so that a pressure function of the entire valve, proportional to an input signal, for example, the solenoid current, may be represented over the entire pressure range.

SUMMARY OF THE INVENTION

An object of the present invention is to provide a solenoid valve device, in particular a hydraulic valve device, manufacturable in a cost-effective manner and requiring less installation space than conventional solenoid valve devices.

A solenoid valve device, in particular a hydraulic valve device, for example, an electrohydraulic proportional pressure valve, has a solenoid element which is movable from a non-energized retracted state to an energized extended state, the stroke of the solenoid element from its retracted state to its extended state in the range at an essentially constant magnetic force being referred to as a constant force working stroke and in the related art being normally reduced, via stroke limitation, by an idle stroke in which the magnetic force is not constant, but decreases over the stroke. According to the present invention, the stroke limitation of the solenoid element is varied in such a way that both the constant force working stroke and the idle stroke are utilized as the working stroke of the solenoid element. The solenoid element is preferably a proportional solenoid, which includes an armature having a plunger and a coil and is used to displace a valve piston when the coil is energized. When the working stroke of the solenoid element is extended by the idle stroke, greater piston strokes and thus opening cross sections may be implemented in the solenoid valve device to reduce the back pressure. By using the idle stroke, the stroke work in the operation of the solenoid valve device may be reduced. The disadvantage of a non-constant and reduced magnetic force in the idle stroke compared to the conventional design is consciously taken into account according to the present invention.

A preferred exemplary embodiment of the solenoid valve device may be characterized in that a rest point of the solenoid element in the non-energized state is designed in such a way that a stroke from the rest point to a minimum working point, initiated by energizing the solenoid element, is ensured for all operating states (volume flows and viscosities). This design ensures, for example, reliable entry into the constant force range (proportional range) and regular operation of the solenoid valve device for small strokes.

Another preferred exemplary embodiment of the solenoid valve device may be characterized in that a starting current of the solenoid element during switch-on of the solenoid valve device is higher than the current when the minimum working point is reached, but lower than a maximum admissible current. This ensures that the solenoid element is moved reliably from its rest position defined by the rest point to the minimum working point and thus to the beginning of the working force range.

Another preferred exemplary embodiment of the solenoid valve device may be characterized in that the minimum working point is located in the range of the constant force working stroke of the solenoid element. The minimum working point is preferably, but not necessarily, located on a constant force branch of the characteristic curve of the solenoid.

BRIEF DESCRIPTION OF THE DRAWINGS

Further advantages, features and details of the present invention result from the description that follows, in which different exemplary embodiments are individually described with reference to the drawing. The features mentioned in the claims and in the description may be essential to the invention per se or in any desired combination.

FIG. 2 shows a characteristic curve as in FIG. 1 for an extended working stroke; and FIG. 3 shows a Cartesian coordinate system in which the pressure force of a pressure limiting valve and the magnetic force are plotted against the path of a valve piston, i.e., the working stroke of the solenoid at different electric currents.

FIG. 4 shows an embodiment of a solenoid valve device in the present invention.

DETAILED DESCRIPTION OF THE PREFERRED EMBODIMENTS

Figure 1:
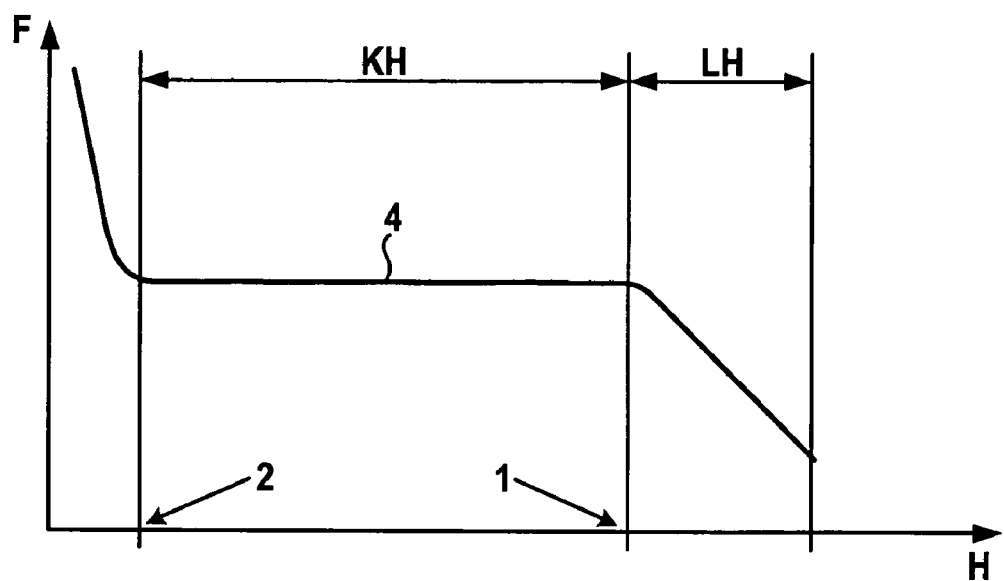
FIG. 1 shows a Cartesian coordinate diagram in which the magnetic force is plotted against the solenoid stroke at constant current in the form of a characteristic curve of a proportional solenoid.

Within the scope of the present invention, ideas to reduce the cost and the installation space of valve solenoids of electrohydraulic pressure valves have been applied. In particular, approaches for stabilizing the rocking motion in the chassis hydraulics have been sought for keeping the required stroke work of the solenoid as low as possible. At operating temperatures, in general small paths are sufficient to set the required pressures at the control edges of a pressure valve. However, at high volume flows and low oil temperatures (high oil viscosity), very small back pressures are implemented, which makes it necessary for the valve to provide large opening cross-sections. This requirement is directly related to large valve strokes. In a conventional design, large valve strokes result in considerably more expensive and larger solenoids.

FIG. 1 shows magnetic force F plotted against solenoid stroke H at a constant current in the form of a force/path characteristic curve of a proportional solenoid. FIG. 4 shows the solenoid 10 preferably has an armature having a plunger 20, the plunger 20 being able to displace a valve piston 30. U.S. Pat. Nos. 6,637,282 and 6,955,101 for example describe and depict solenoids and are hereby incorporated by reference herein. The fully retracted state of the solenoid plunger is labeled 1. The fully extended state of the solenoid plunger is labeled 2. A stroke limitation of conventional solenoid valves ensures that not the full stroke of the solenoid, but only a constant force working stroke KH in which the magnetic force F is constant, is used for the solenoid working stroke. An idle stroke LH, in which the magnetic force F decreases over stroke H, is not used for the working stroke in conventional solenoid valves.

The stroke work, which determines the cost and the installation space, is given in FIG. 1 by the area under characteristic curve 4 in constant force stroke KH.

According to the present invention, the working stroke is extended by idle stroke LH, and greater piston paths and thus greater opening cross sections may be implemented in the valve 30 (shown in FIG. 4) to reduce the back pressure.

FIG. 2 shows a force/path characteristic curve of a solenoid valve 30 according to the present invention, where both constant force stroke KH and idle stroke LH (see FIG. 1) are used for working stroke AH. The fully retracted state of the solenoid plunger 20 (shown in FIG. 4) is labeled 11. The fully extended state of the solenoid plunger 20 (shown in FIG. 4) is labeled 12. A minimum working point, for example, for the pressure limitation function, is labeled 13. A maximum working point is labeled 14. A rest point is labeled 16. The advantage of the characteristic curve illustrated in FIG. 2 is the reduction of stroke work by the use of the decreasing characteristic curve branch as indicated by shaded area 18. A disadvantage is a magnetic force F which, in the extended work range, is reduced in comparison with the conventional design and is not constant.

FIG. 3 shows pressure force P and magnetic force F of a solenoid valve 10 (shown in FIG. 4) according to the present invention plotted against the stroke, i.e., path W of a slider or valve piston 30 (shown in FIG. 4). The path is also referred to as a slider path. The solenoid valve 10 (shown in FIG. 4) is, for example, a pressure-limiting valve. FIG. 3 shows different solenoid characteristic curves 27, 28, 29 for different electric currents 21, 22, 23. The intensity of the electric currents decreases from 21 to 23. In addition, FIG. 3 shows a valve characteristic curve 31 for a constant volume flow and increasing pressure. The minimum working point for the pressure limitation function is labeled 33 in FIG. 3. The maximum working point for the pressure limitation function is labeled 34 in FIG. 3. In FIG. 3, the rest point is labeled 36.

FIG. 3 shows that the supposed disadvantage of reduced and non-constant magnetic force results in no impairment of the valve function. In the non-energized state, rest point 36 on valve characteristic line 31 is such that for all operating states (volume flows and viscosities) a path from rest point 36 to minimum working point 33 of the solenoid valve 10 (shown in FIG. 4) according to the present invention, initiated by energizing the solenoid 10 (shown in FIG. 4) is ensured, as indicated by arrows 38, 39. Starting current 22 is higher during switch-on than current 21 when minimum working point 33, i.e., the minimum pressure to be regulated, is reached, but lower than maximum admissible current 23. The range of idle stroke LH (see FIG. 1) is indicated in FIG. 3 by two dashed lines 41, 42, between which magnetic force F decreases. Minimum working point 33 is preferably located in the range of solenoid characteristic curves 27 through 29 in which the magnetic force F is constant.

The present invention provides a proportional valve, in particular a pressure-limiting valve, having an extended working range, which utilizes the non-constant range of the characteristic curve of a proportional solenoid. This makes the use of large and expensive solenoids unnecessary. The present invention also provide a method for altering a solenoid working range by altering a stroke limitation, for example using a controller for the solenoid.

LIST OF REFERENCE NUMERALS 1. retracted state
2. extended state
4. characteristic curve
10. solenoid valve device
11. retracted state
12. extended state
13. minimum working point
14. maximum working point
16. rest point
18. shaded area
20. plunger
21. current
22. current
23. current
27. solenoid characteristic curve
28. solenoid characteristic curve
29. solenoid characteristic curve
30. valve piston
31. valve characteristic curve
33. minimum working point
34. maximum working point
36. rest point
38. arrow
39. arrow
41. dashed line
42. dashed line

What is claimed is:

1. A solenoid valve device comprising:
a solenoid element including an armature having a plunger and a valve; the solenoid element being movable from a non-energized retracted state to an energized minimum working point and on to an energized extended state wherein the armature displaces the valve piston in the retracted and extended states, a working stroke of the solenoid element from a retracted state into an extended state including a constant magnetic force segment and a decreasing magnetic force segment wherein the decreasing magnetic force segment occurs between the minimum working point and the retracted state.

2. The solenoid valve as recited in claim 1 wherein the solenoid valve device is a hydraulic valve device.

3. The solenoid valve device as recited in claim 1 wherein the solenoid element has a rest point in the non-energized state so that a stroke from the rest point to a minimum working point, initiated by energizing the solenoid element, is ensured for all operating states.

4. The solenoid valve device as recited in claim 3 wherein a starting current of the solenoid element is higher during switch-on of the solenoid valve device than the current when the minimum working point is reached, but lower than a maximum admissible current.

5. The solenoid valve device as recited in claim 3 wherein the minimum working point is located in a range of the constant magnetic force working stroke of the solenoid element.

6. The solenoid valve device as recited in claim 1 wherein between the minimum working point and the extended state is a maximum working point.

* * * * *